United States Patent [19]

Goldstein

[11] Patent Number: 4,996,842
[45] Date of Patent: Mar. 5, 1991

[54] HEAT ENGINE WITH CORRUGATED SHAPE MEMORY DRIVE BELT

[75] Inventor: David Goldstein, Adelphi, Md.

[73] Assignee: The United States of America as represented by the Secretary of the Navy, Washington, D.C.

[21] Appl. No.: 554,509

[22] Filed: Jul. 19, 1990

[51] Int. Cl.⁵ .............................................. F03G 7/06
[52] U.S. Cl. ..................................................... 60/527
[58] Field of Search ........................... 60/527, 528, 529

[56] References Cited

U.S. PATENT DOCUMENTS 4,030,298  6/1977  Sandoval ............................... 60/527
4,938,026  7/1990  Goldstein ............................. 60/527

FOREIGN PATENT DOCUMENTS 191477  11/1982  Japan ..................................... 60/527
219477  11/1985  Japan ..................................... 60/527

Primary Examiner—Allen M. Ostrager
Attorney, Agent, or Firm—Kenneth E. Walden; Jacob Shuster

[57] ABSTRACT

An endless drive belt made of shape memory material is entrained about spaced pulleys, one of which projects into a thermal heating region within which the drive belt undergoes contraction to form corrugations therein through which variable spaced contact is established with said one of the pulleys to induce rotation thereof and movement of the belt. The belt expands as it moves out of the thermal heating region causing the corrugations to flatten out as the belt approaches the other pulley.

5 Claims, 2 Drawing Sheets

HEAT ENGINE WITH CORRUGATED SHAPE MEMORY DRIVE BELT

BACKGROUND OF THE INVENTION

This invention relates generally to the conversion of heat energy into mechanical energy using shape memory alloys, such as NITINOL as disclosed for example in U.S. Pat. Nos. 4,010,612 and 4,030,298 to Sandoval, and in my prior pending U.S. Pat. Application No. 07/539,942, pending filed Jun. 18, 1990.

The properties of shape memory alloys, especially Nitinol, have been extensively studied and applied to the construction of heat engines including those employing endless drive belts made of the shape memory alloy entrained about pulleys, the belt material being heated and cooled locally at different points in the apparatus so that the changes in shape of the belt material when heated cause the pulleys to rotate.

SUMMARY OF THE INVENTION

In the heat engine of this invention, a thin sheet of Nitinol material formed into an endless drive belt has corrugations in discontinuous contact at spaced locations with a pulley type roller disposed within a thermal heating region such as a heated body of liquid in which a portion of the belt is immersed. The portion of the belt as it enters the heating region contracts to induce rotation as a result of unbalanced forces transmitted at the spaced points of contact on one of the pulleys. The other pulley is located at a lower temperature region within which the belt expands to engage such other pulley along a flattened portion of the drive belt.

BRIEF DESCRIPTION OF THE DRAWINGS

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
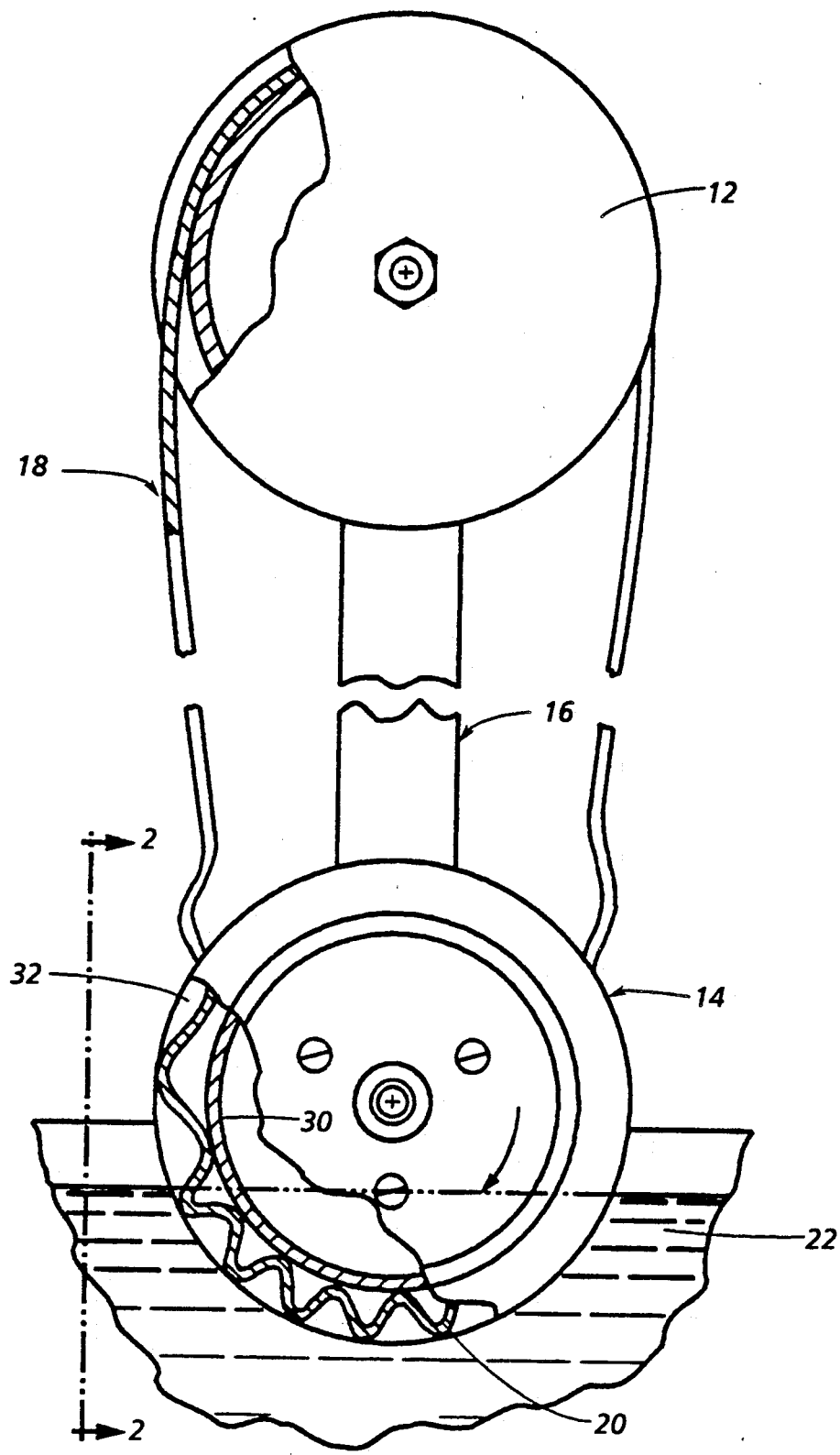
FIG. 1 is a side elevation view of the heat engine of this invention with parts broken away and shown in section.
Figure 2:
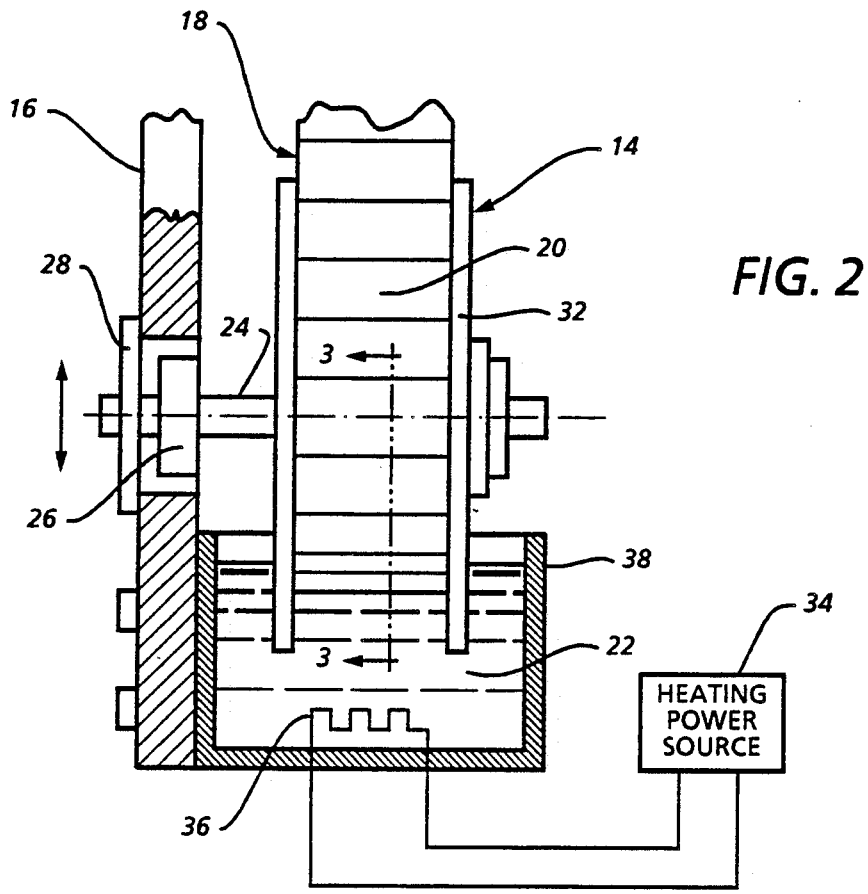
FIG. 2 is a partial section view of the heat engine taken along section line 2—2 in FIG. 1.

The heat engine of this invention, generally referred to by reference numeral 10, comprises a pair of drive roller pulleys 12 and 14 mounted in spaced relation to each other on a frame 16 as shown in FIG. 1. An endless drive belt 18 made of thin Nitinol sheet material is entrained about the pulleys. A portion of the drive belt 18 entrained about pulley 14 is undulated or formed with corrugations 20 having variable spacing between contact points or pitch P (the distance between two adjacent contact points) and a sheet material thickness t as denoted in FIG. 3. The portion of the drive belt 18 having the corrugations 20 is in one state while exposed to a source of heat energy through a body of heated liquid 22 as shown in FIGS. 1 and 2. On the other hand, the flattened portion of drive belt 18 entrained about pulley 12 is in its other state while exposed to a colder region than the heating region of the heated liquid body 22. The dimensions of the corrugated portion of the drive belt will be "remembered" by the flattened portion as it transforms from one state to the other during operation of the heat engine.

Figure 3:
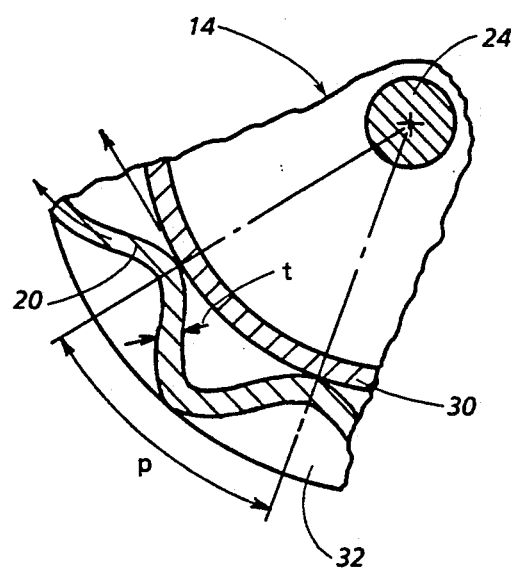
FIG. 3 is an enlarged partial section view of the heat engine taken along section line 3—3 in FIG. 2.

The pulleys 12 and 14 carried by the support frame 16 are rotatably mounted about axes, which are adjustably spaced from each other according to the embodiment shown in FIG. 2. The pulley 14 includes a shaft 24 rotatably supported in bearing 26 affixed to the frame by an adjustably positioned plate 28 of a suitable adjustment device to establish the desired belt tension. The shaft 24 is connected to a pulley wheel having an annular drum portion 30 recessed radially inwardly of outer flange portions 32 between which the drive belt is received as shown in FIGS. 1 and 3. The pulley 12 may be of similar construction as that of pulley 14 and is journaled for rotation about an axis spaced from the axis of pulley shaft 24. Mechanical energy is extracted from the engine 10 through either of the pulley shafts.

As shown in FIG. 2, the Nitinol drive belt 18 receives heat through the body of liquid 22 from a heating power source 34 electrically connected to a heating element 36 within the body of liquid 22. The engine 10 is oriented by attachment of its frame 16 to the liquid container 38 within which the liquid body is retained to establish a thermal heating region.

The portion of the Nitinol drive belt exposed to the thermal heating region heats up and assumes its austenitic, contracted state characterized by the undulations or corrugations 20. The Nitinol drive belt moving upwardly as shown or away from the liquid body 22 loses heat primarily through radiation to colder surroundings so as to cool down within the thermally colder region within which the pulley 12 is located. The tension in the drive belt and engagement with pulley 12 within the colder region transforms the shape memory material to its martensitic expanded state in which the belt is substantially flattened for continuous contact engagement with the pulley 12 as shown in FIG. 1.

The pitch spacing P of the corrugations 20 on the Nitinol belt 18 in its contracted austenitic varies during movement through the thermal heating region during which the corrugations are in spaced contact with pulley drum 30 as shown in FIG. 3. The reformation of the corrugations 20 sustains rotation of the pulley 14 and movement of the drive belt in one direction under unbalanced contact forces resulting from exposure to the heat supplied to the body of liquid 22.

As the Nitinol belt moves the corrugations 20 are formed therein as the belt enters the thermal heating region and heats up through absorption of heat undergoing transformation to the austenitic state. In so doing, the corrugations 20 exiting the thermal heating region enter the colder region and are cooled down as the belt enters the martenistic state in which the Nitinol material is soft and pliable. In this latter state, the corrugations 20 flatten out as the belt approaches the pulley 12 as seen in FIG. 1.

According to one operating embodiment, a drive belt 18 having a thickness (t) of 3 mil extends between pulleys 12 and 14 having their axes spaced from each other by 16 inches, The pulleys 12 and 14 have diameters of 4 inches and 2 ¼ inches, respectively, and the colder region for pulley 12 is ambient air at approximately 20° C. while the thermal heating region is at a temperature of 85° C. to 100° C. within the heated water as the liquid body 22.

Numerous other modifications and variations of the present invention are possible in light of the foregoing teachings. It is therefore to be understood that within the scope of the appended claims the invention may be practiced otherwise than as specifically described.

What is claimed is:

1. In a heat energy conversion system including a pair of pulleys, an endless drive belt made of shape memory material and means rotatably mounting the pulleys about spaced axes for rotation in response to exposure of the drive belt to differential temperature regions while in frictional engagement with the pulleys, the improvement residing in said drive belt having a substantially flattened portion within one of said temperature regions and another portion formed with undulations limiting said frictional engagement thereof with one of the pulleys to spaced contact locations thereon.

2. In a heat energy conversion system including a pair of pulleys, an endless drive belt made of shape memory material and means rotatably mounting the pulleys about spaced axes for rotation in response to exposure of the drive belt to differential temperature regions while in frictional engagement with the pulleys, the improvement residing in said drive belt being formed with undulations limiting said frictional engagement thereof with one of the pulleys to spaced contact locations thereon and means pretensioning the drive belt for removal of said undulations along a substantially flattened portion thereof to establish said frictional engagement with the other of the pulleys by continuous contact.

3. An engine for converting heat energy into mechanical energy, including a drive element made of shape memory material having corrugations thereon, a roller in engagement with said corrugations within a thermal heating region, frame means rotatively positioning the drive element and the roller for restrictively exposing the corrugations to the heat energy to induce rotation of the roller and movement of the drive element, the improvement residing in said drive element being an endless belt on which the corrugations are formed, a second roller in engagement with the endless belt to guide said movement thereof, and means pretensioning the endless belt for flattening thereof by removal of the corrugations during said engagement with the second roller.

4. In combination with a source of heat energy, means for converting the heat energy into mechanical energy comprising a pair of rollers, frame means mounting said rollers for rotation about spaced axes in operatively oriented relation to said source and drive means operatively positioned by the rollers for restricted exposure to the heat energy within a thermal heating region, said drive means including a deformable element in continuous contact engagement with one of the pair of rollers within a thermally colder region at a predetermined temperature differential to the thermal heating region and in variably spaced contact engagement with the other of the pair of rollers within the thermal heating region.

5. The combination of claim 4 wherein said deformable element is an endless drive belt made of shape memory material having corrugations formed therein to establish said variably spaced contact engagement with the other of the rollers.

* * * * *